US012759497B2

(12) United States Patent
Benthall et al.

(10) Patent No.: US 12,759,497 B2
(45) Date of Patent: Oct. 13, 2026

(54) CYLINDRICAL INFLATOR ASSEMBLY

(71) Applicant: ARC TECHNOLOGY HOLDING LIMITED, Hong Kong (HK)

(72) Inventors: Samuel Benthall, Friendsville, TN (US); Kristian Winston, Knoxville, TN (US); Scott Lohmann, Knoxville, TN (US); Brian Thomas, Maryville, TN (US); Tyler Laughter, Knoxville, TN (US); Susilpa Bommareddy, Knoxville, TN (US)

(73) Assignee: ARC TECHNOLOGY HOLDING LIMITED, Tsimshatsui (HK)

( * ) Notice: Subject to any disclaimer, the term of this patent is extended or adjusted under 35 U.S.C. 154(b) by 0 days.

(21) Appl. No.: 19/040,664

(22) Filed: Jan. 29, 2025

(65) Prior Publication Data

US 2025/0249860 A1 Aug. 7, 2025

Related U.S. Application Data

(60) Provisional application No. 63/549,773, filed on Feb. 5, 2024.

(51) Int. Cl.
*B60R 21/261* (2011.01)
*B60R 21/264* (2006.01)
*B60R 21/276* (2006.01)

(52) U.S. Cl.
CPC .......... *B60R 21/261* (2013.01); *B60R 21/264* (2013.01); *B60R 21/2644* (2013.01); *B60R 21/276* (2013.01); *B60R 2021/2612* (2013.01)

(58) Field of Classification Search
CPC . B60R 21/261; B60R 21/264; B60R 21/2644; B60R 21/276; B60R 2021/2612;
(Continued)

(56) References Cited

U.S. PATENT DOCUMENTS 5,360,232 A 11/1994 Lowe et al.
5,551,724 A 9/1996 Armstrong et al.
(Continued)

FOREIGN PATENT DOCUMENTS

CN 208232994 U 12/2018
CN 219029352 U 5/2023
(Continued)

OTHER PUBLICATIONS

WO-03045739-A1 (machine translation) (Year: 2003).*
(Continued)

*Primary Examiner* — Jason D Shanske
*Assistant Examiner* — Joselynn Y Sliteris
(74) *Attorney, Agent, or Firm* — NIXON & VANDERHYE P.C.

(57) ABSTRACT

An airbag inflator assembly includes a cylindrical housing and internal components disposed in the cylindrical housing. The internal components include an initiator assembly, a generant, an internal nozzle, and a canister downstream of the internal nozzle. A center vent is secured to a downstream end of the cylindrical housing and includes a central passageway adjacent the canister for products of combustion and an exit passage that directs the products of combustion out of the assembly. The internal components and the center vent define a tortuous path for the products of combustion.

19 Claims, 8 Drawing Sheets

(58) Field of Classification Search
CPC .......... B60R 21/272; B60R 2021/2633; B60R 2021/2648; B60R 2021/2685; B60R 21/26; B60R 2021/26029; B60R 2021/26076
See application file for complete search history.

(56) References Cited

U.S. PATENT DOCUMENTS

| | | | |
|---|---|---|---|
| 6,189,927 | B1 | 2/2001 | Mossi et al. |
| 7,134,689 | B2 | 11/2006 | Matsuda |
| 7,530,598 | B2 | 5/2009 | Fischer et al. |
| 7,600,783 | B2 | 10/2009 | Numoto et al. |
| 7,654,565 | B2 | 2/2010 | McCormick et al. |
| 7,712,778 | B2 | 5/2010 | Smith et al. |
| 7,770,924 | B2 | 8/2010 | Cox et al. |
| 8,894,096 | B2 | 11/2014 | Fischer |
| 9,193,327 | B2 | 11/2015 | Clark |
| 9,700,825 | B2 | 7/2017 | Greenwood et al. |
| 11,091,118 | B2 * | 8/2021 | Lin ..................... B60R 21/2644 |
| 11,273,788 | B2 | 3/2022 | Bendle et al. |
| 2005/0029785 | A1 * | 2/2005 | Bilbrey ................. B60R 21/272 280/736 |
| 2005/0280252 | A1 | 12/2005 | McCormick |
| 2007/0257476 | A1 | 11/2007 | Green et al. |
| 2009/0283006 | A1 | 11/2009 | Abaziou |
| 2012/0326423 | A1 | 12/2012 | Hoffman |
| 2022/0126780 | A1 | 4/2022 | Simons et al. |

FOREIGN PATENT DOCUMENTS

| | | | |
|---|---|---|---|
| JP | 2007099266 | A | 4/2007 |
| JP | 2008537918 | A | 10/2008 |
| WO | WO-03045739 | A1 * | 6/2003 |

OTHER PUBLICATIONS

Extended European Search Report dated Jun. 12, 2025 issued in European Patent Application No. 25155810.2, 6 pp.
Japanese Office Action dated Dec. 3, 2025 issued in Japanese Patent Application No. 2025-016342 and English translation, 13 pp.

* cited by examiner

CYLINDRICAL INFLATOR ASSEMBLY

CROSS-REFERENCES TO RELATED APPLICATIONS

This application claims the benefit of U.S. Provisional Patent Application Ser. No. 63/549,773 filed Feb. 5, 2024, the entire content of which is herein incorporated by reference.

STATEMENT REGARDING FEDERALLY SPONSORED RESEARCH OR DEVELOPMENT (NOT APPLICABLE)

BACKGROUND

The invention relates to an inflator assembly for an airbag or other safety device and, more particularly, to an inflator assembly with a cylindrical housing for passenger applications in vehicles that provides repeatable performance, compliant variation, and meets all industry standards.

Existing airbag inflator assemblies come in various shapes with recent versions in a toroidal shape. Newly designed vehicles, particularly electric vehicles (EVs) have limited space for airbag assemblies, and there is a need for an inflator assembly with a cylindrical housing having a reduced outside diameter.

SUMMARY

The inflator assembly of the described embodiments was developed with the intent to optimize the performance output range while meeting all structural and safety requirements. An objective is to produce a cylindrical inflator assembly for passenger applications in vehicles that provides repeatable performance, compliant variation, and meets all industry standards.

The design achieves performance outputs, assembly weights, and an envelope profile (overall length and outer diameter) that are conducive to applications in EV technology. These optimizations provide a competitive edge over existing passenger designs.

The assembly of the described embodiments uses a tortuous path ignition system to lower particulate levels expelled from the inflator assembly, while meeting its performance targets.

In some embodiments, the inflator assembly uses primary and secondary initiators, located at opposite ends of the assembly, to actuate the ignition train by deploying directly into the generant booster(s). The booster propellants, in turn, ignite the propellant chambers, and the internal combustion of the propellant and stored gas mixture begins to increase the internal pressure. The association between the firing of the primary and secondary initiators/boosters/main propellant can be performance tailored by an actuation delay (greater than or equal to 0).

The ignition train for both primary and secondary chambers will follow the same process—either simultaneously or on a delayed deployment.

As the generant burns and mixes with the stored gas in the housing(s), the products of combustion pass through a series of mediums and channels that serve as collection areas for larger particles created through the combustion process. The primary medium (closed top spring) loads the propellant bed, but also provides a surface to block larger particles. The secondary medium (screen) is designed to retain and/or provide a plating surface for particulate.

In an exemplary embodiment, an airbag inflator assembly includes a cylindrical housing, an initiator assembly secured in an upstream end of the cylindrical housing, a generant disposed in the cylindrical housing adjacent the initiator assembly, and an internal nozzle through which products of combustion flow. The internal nozzle engages an inside wall of the cylindrical housing. A canister is disposed in the cylindrical housing downstream of the internal nozzle. The internal nozzle is configured to direct the products of combustion into the canister. The canister includes radial orifices adjacent an upstream end, and an outside diameter of the canister is spaced from the inside wall of the cylindrical housing to hereby define an annular passageway. A center vent secured to a downstream end of the cylindrical housing includes a central passageways adjacent the canister for the products of combustion and an exit passage that directs the products of combustion out of the assembly.

An interface between the internal nozzle, the inside wall of the cylindrical housing, and the outside diameter of the canister may define a turn point and a particle collection area for the products of combustion. The canister may include exterior castellations through which the products of combustion flow upstream of the center vent.

The exit passage may be oriented 90 degrees relative to the central passageway. The center vent may include two exit passages spaced 180 degrees apart. A burst disk may be secured at an end of each of the exit passages prior to activation of the inflator assembly.

An outside diameter of the cylindrical housing may be 40 mm or less, for example 35.6 mm.

In some embodiments, the inflator assembly may include a dummy housing secured to a side of the center vent opposite from the cylindrical housing.

In some embodiments, the inflator assembly may include a second stage housing secured to a side of the center vent opposite from the cylindrical housing, a second stage initiator assembly secured in an upstream end of the second stage housing, a second stage generant disposed in the second stage housing adjacent the second stage initiator assembly, a second stage internal nozzle engaging an inside wall of the second stage housing, and a second stage canister disposed in the second stage housing downstream of the second stage internal nozzle.

A screen canister may be interposed between the canister and the center vent. The screen canister may include a plurality of apertures.

In another exemplary embodiment, an airbag inflator assembly includes a cylindrical housing, internal components disposed in the cylindrical housing such as an initiator assembly, a generant, an internal nozzle, and a canister downstream of the internal nozzle, and a center vent secured to a downstream end of the cylindrical housing. The center vent has a central passageway adjacent the canister for products of combustion and an exit passage that directs the products of combustion out of the assembly. The internal components and the center vent define a tortuous path for the products of combustion with at least six turns.

The at least six turns may include a first turn at a downstream end of the canister and inside the canister in an opposite direction toward the radial orifices, a second turn through the radial orifices and into the annular passageway, a third turn along the annular passageway, a fourth turn at an interface of the center vent and the cylindrical housing, a fifth turn into the central passageway of the center vent, and a sixth turn from the central passageway into the exit passage. A seventh turn may be defined after contact with a diffuser from the exit passage toward exhaust ports of the diffuser.

BRIEF DESCRIPTION OF THE DRAWINGS

These and other aspects and advantages will be described in detail with reference to the accompanying drawings, in which.

DETAILED DESCRIPTION

Figure 1:
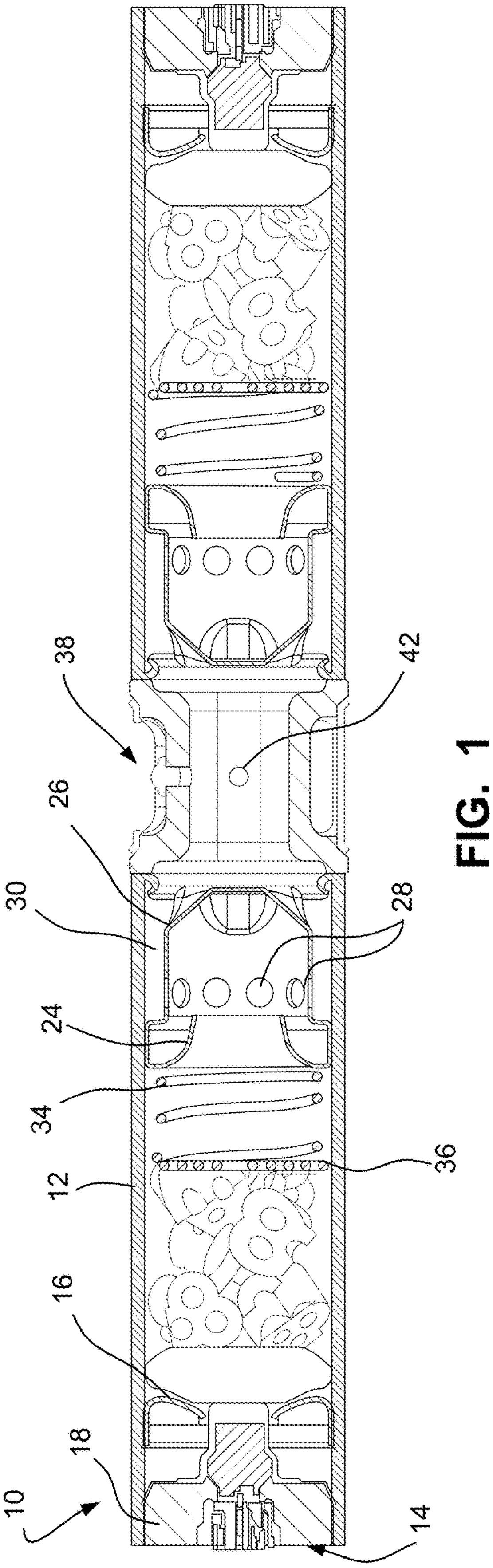
FIGS. 1 and 2 show an inflator assembly and its internal components.
Figure 2:
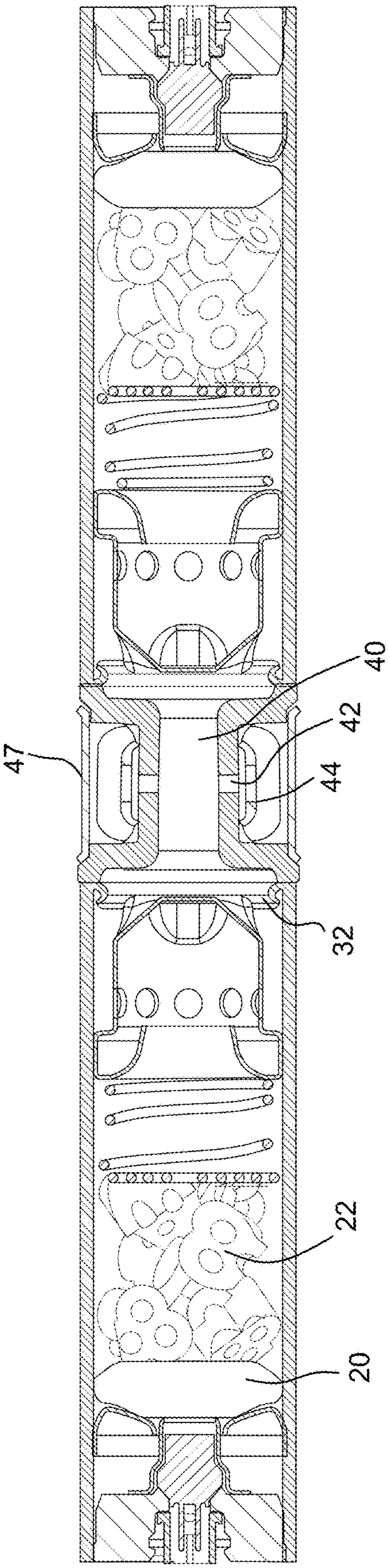

FIGS. 1 and 2 show an exemplary dual stage airbag inflator 10 and its internal components. The inflator assembly includes a cylindrical housing 12 and an initiator assembly 14 secured in an upstream end of the cylindrical housing 12. In a preferred construction, an outside diameter of the cylinder housing 12 is 40 mm or less, for example 35.6 mm. The initiator assembly 14 includes a cover disk 16 or the like that is press fit into and engages an interior surface of the cylindrical housing 12 and together with an igniter body 18 secures the initiator assembly 14 in place. The structure, function, and operation of the initiator assembly 14 are known, and further details will not be described. Any suitable initiator assembly 14 could be used with the airbag inflator assembly 10 of the described embodiments.

A booster pouch 20 is positioned adjacent the cover disk 16, and a generant material 22 is disposed in the housing 12 adjacent the initiator assembly 14 and the booster pouch 20.

An internal nozzle 24 directs products of combustion into a canister 26 downstream of the internal nozzle 24. As shown, the nozzle 24 engages the inside wall of the cylindrical housing 12. The internal nozzle 24 may be integral with the canister 26.

The canister 26 includes radial orifices 28 adjacent an upstream end. With continued reference to FIGS. 1 and 2, an outside diameter of the canister 26 is spaced from the inside wall of the cylindrical housing 12, thereby defining an annular passageway 30. An exterior of the canister 26 includes castellations 32 through which the products of combustion flow.

A coil spring 34 may be secured between the internal nozzle 24 and the generant 22 to secure the generant 22 in the propellant chamber. A screen 36 may be interposed between the spring 34 and the generant 22 depending on the size of the generant 22.

Figure 9A:
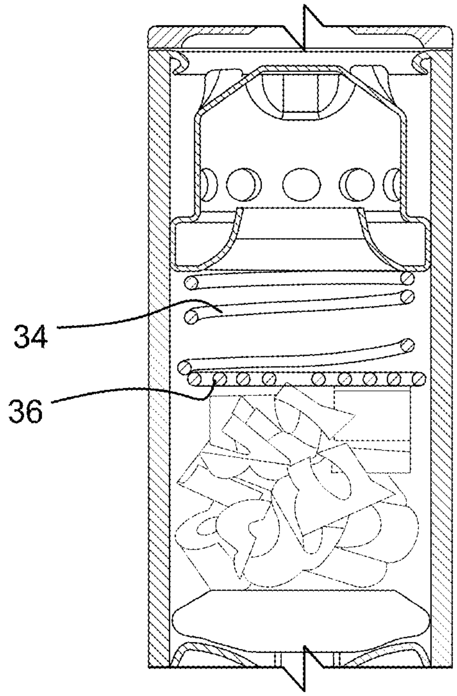
FIGS. 9A-9D show variations of the internal components.
Figure 9B:
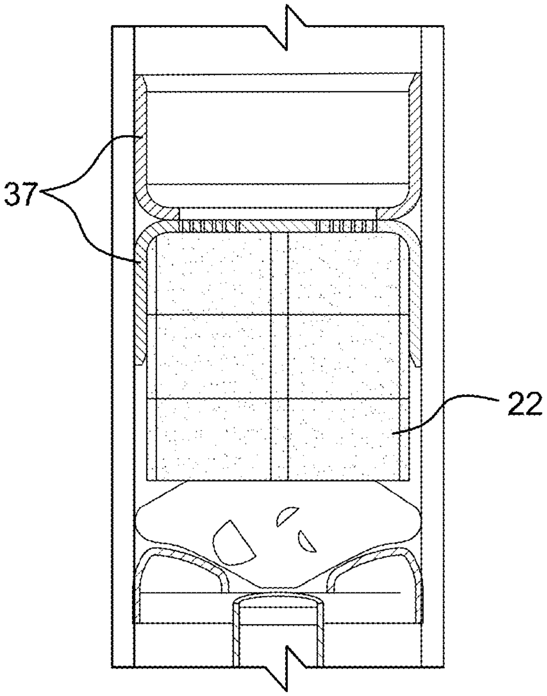
Figure 9C:
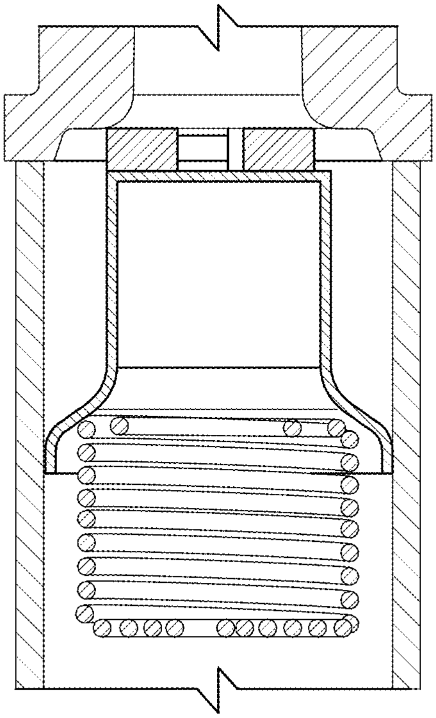
Figure 9D:
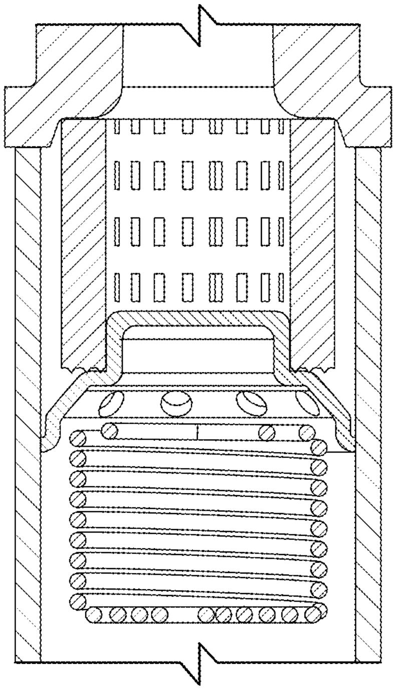

Additional or alternative components may be used to secure the generant in the propellant bed such as a formed cup with a filter top or the like. Examples are shown in FIGS. 9A-9D. FIG. 9A shows the baseline design with the coil spring 34 and screen 36. FIG. 9B shows a dual cup design with cups 37 securing the generant 22. FIG. 9C shows a debris accumulator with spring design, and FIG. 9D shows a filter, diverter and spring design.

With continued reference to FIGS. 1 and 2, a center vent 38 is secured to a downstream end of the cylindrical housing 12. The center vent 38 includes a central passageway 40 adjacent the canister 26 for the products of combustion and at least one exit passage 42 that directs the products of combustion out of the assembly. Two exit passages 42 are shown in FIGS. 1 and 2. With two exit passages, the exit passages 42 may be spaced 180 degrees apart. The exit passage(s) 42 may be oriented 90 degrees relative to the central passageway 40.

Figure 6B:
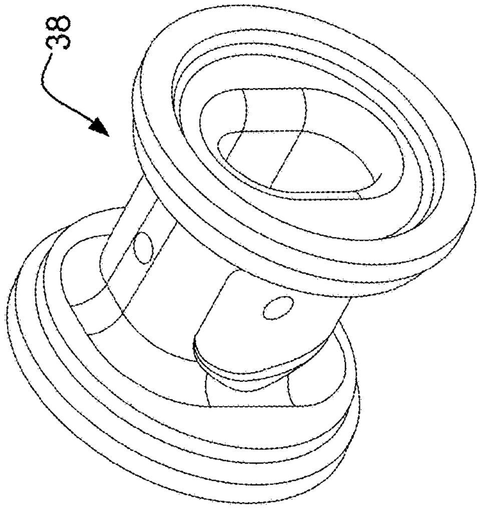
FIGS. 6A and 6B show the center vent component.
Figure 6A:
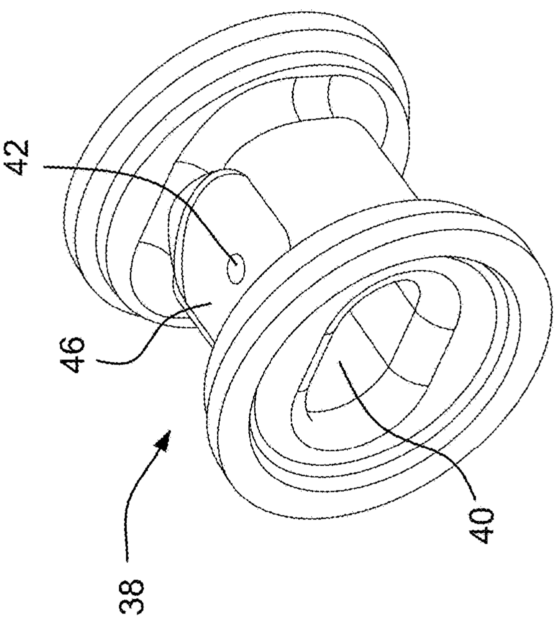

Perspective views of the center vent 38 are shown in FIGS. 6A and 6B. The center vent 38 is preferably welded to the downstream end of the cylindrical housing 12. The central passageway 40 connects the first stage of the inflator assembly 10 (left side of the center vent 38 in FIGS. 1 and 2) with the second stage of the inflator assembly 10 (right side of the center vent 38 in FIGS. 1 and 2). The central passageway 40 allows for a shared gas mixture between the first and second stages and performance output between each stage of the inflator 10. The structure also provides a robust interface for the gas fueling of the inflator assembly during processing.

A burst disk assembly 44 is secured at an end of each of the exit passages 42 (prior to activation of the inflator assembly). With continued reference to FIGS. 6A and 6B, an exterior surface 46 of the center vent 38 may be machined flat to facilitate installation of the burst disk assemblies 44. In some embodiments, the center vent 38 includes surfaces for welding dual burst disk assemblies 44 that serve as the exhaust ports for the performance output. In some embodiments, the center vent 38 includes a surface for welding a singular burst disk assembly 44.

Figure 7B:
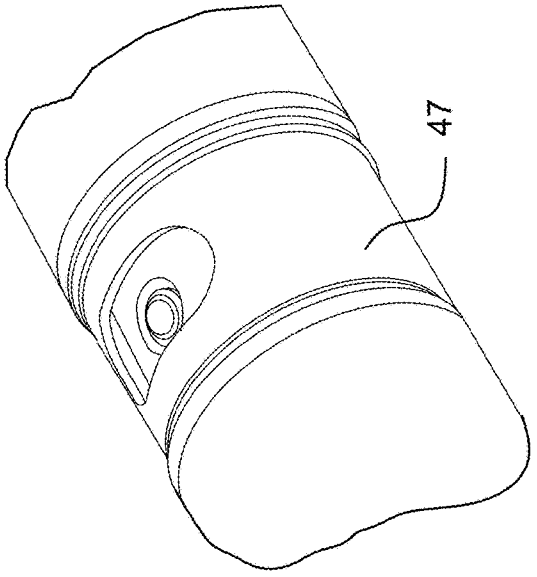
FIGS. 7A and 7B show attachment options for the diffuser component.
Figure 7A:
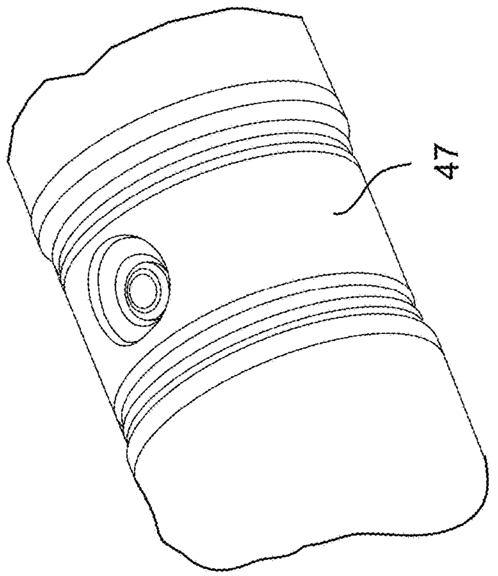

An outer diffuser 47 is secured over the center vent 38. FIGS. 7A and 7B show options for retaining the diffuser 47. The options provide a profiled surface to attach the diffusion component, which allows for dispersion of the performance output during deployment. In FIG. 7A, a mechanical crimp is shown, and in FIG. 7B, a laser weld is shown. In yet another alternative, both a mechanical crimp and a laser weld may be used.

Figure 8C:
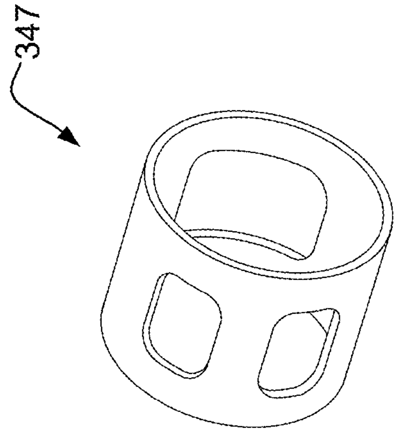
FIGS. 8A-8C show exemplary external diffusers.
Figure 8B:
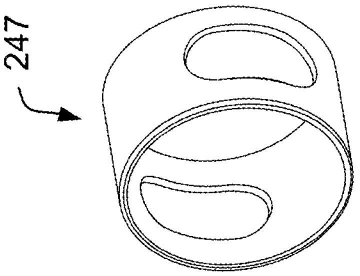
Figure 8A:
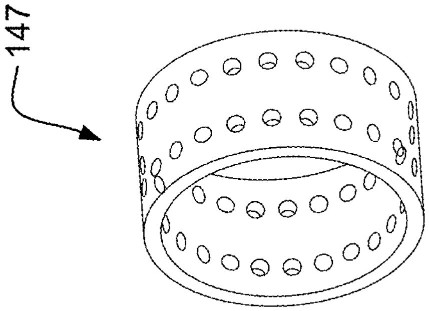

FIGS. 8A-8C show exemplary external diffusers 47 that serve to disperse the inflator output during deployment. The design variations allow for different applications in module assemblies to inflate the airbag. FIG. 8A shows an exemplary external diffuser 147 with 360 degree output including symmetrical vents for the entire perimeter. FIG. 8B shows an external diffuser 247 with 180 degree output including symmetrical vents for localized dual exhaust. FIG. 8C shows an external diffuser 347 with directional output including non-symmetrical vents that aid with error proofing while maintaining thrust neutrality.

The second stage of the dual stage inflator assembly (on the right side of the center vent 38 in FIGS. 1 and 2) includes identical parts and construction.

Figure 3:
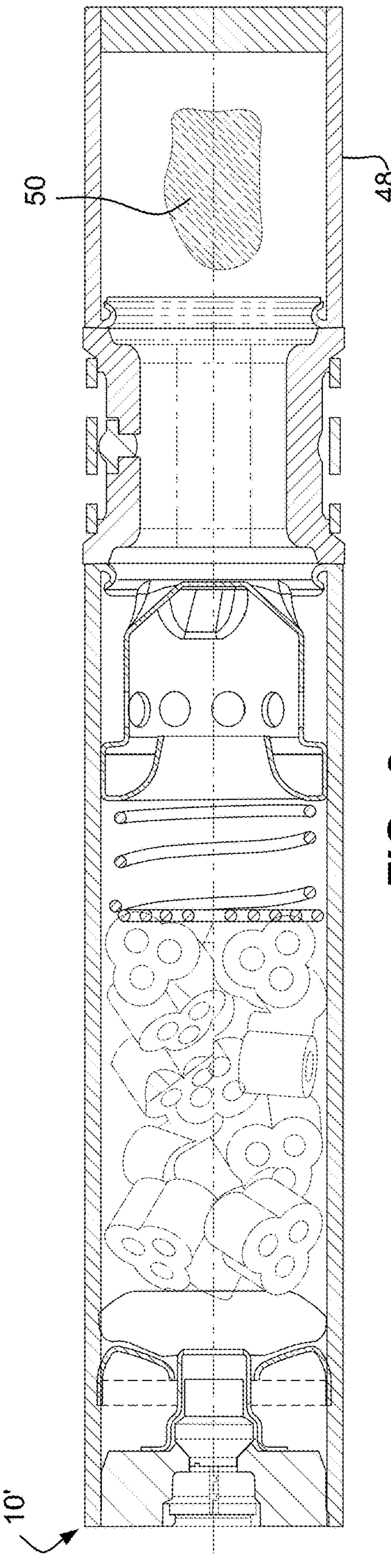
FIG. 3 shows an exemplary single stage embodiment.

FIG. 3 shows an exemplary single stage inflator assembly 10', where the second stage in the dual stage embodiment is replaced with a dummy housing 48. The dummy housing 48 may store pressurized gas such as an argon/helium gas mixture 50 that is shared with the single stage components via the center vent.

Figure 4:
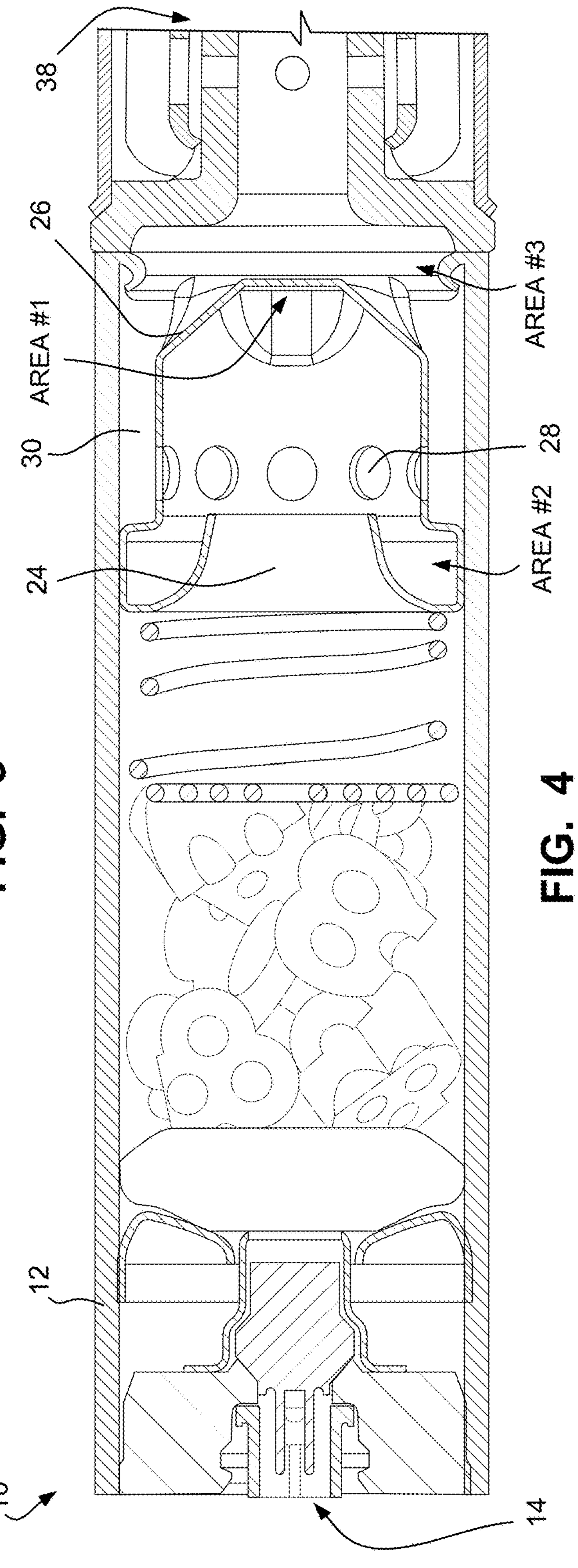
FIG. 4 is a view of one stage of the inflator assembly showing particle collection areas.

FIG. 4 shows collection areas for particles resulting from combustion. It is desirable to prevent combustion particles from exiting the inflator assembly. Upon ignition, products of combustion flow through the internal nozzle 24 and into the canister 26. A downstream end of the canister 26 is closed, and particles resulting from combustion can collect in the canister end (Area #1). The flow is then redirected toward the radial orifices 28 into the annular passage 30. A second particle collection area (Area #2) is located at the corner between the internal nozzle 24 and the canister 26. The flow proceeds along the annular passageway 30 where a third collection area (Area #3) is located at the internal friction weld/location. That is, particles collect in Area #3 at the downstream end of the cylindrical housing 12 where the center vent 38 is secured to the housing 12. The particle collection areas significantly reduce and/or eliminate particles resulting from combustion and prevent any particles from exiting the inflator assembly into the airbag.

Figure 5:
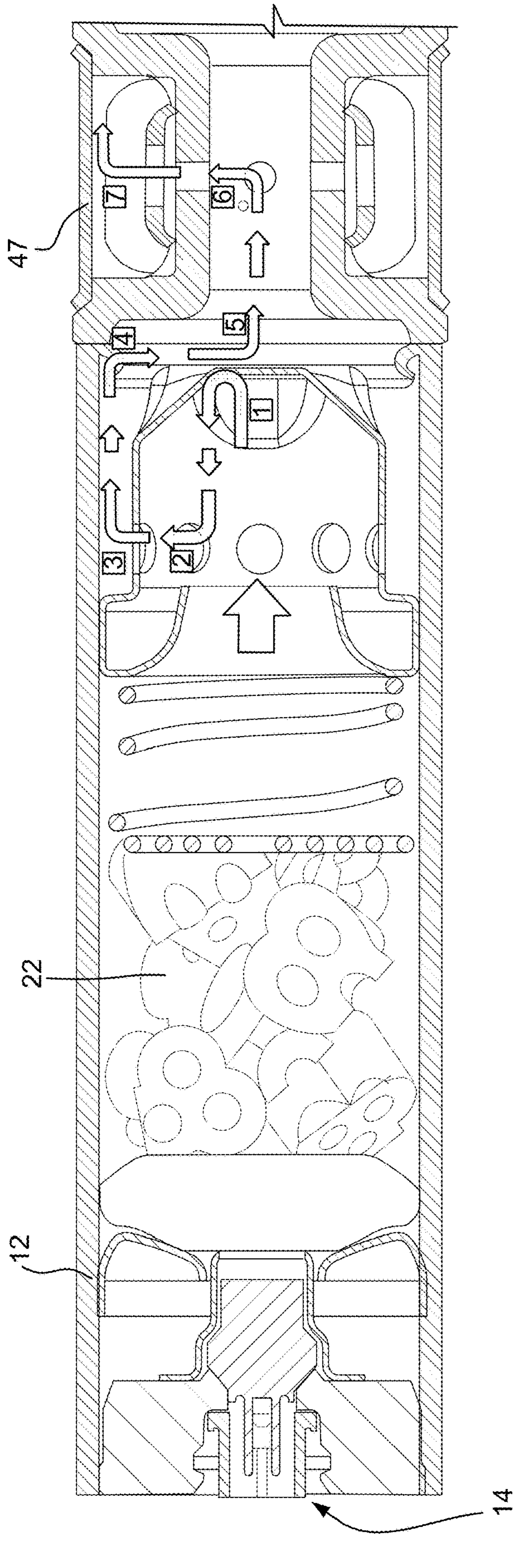
FIG. 5 is a view of one stage of the inflator assembly showing the tortuous path of the products of combustion.

FIG. 5 shows the tortuous path of the products of combustion. In some embodiments, the internal components and the center vent 38 define a tortuous path for the products of combustion with at least six turns. With reference to FIG. 5, after the initiator assembly 14 is actuated, booster generant 22 ignites from the igniter energy, and combustion starts inside the housing 12 and begins to flow through the screen 36 and coil spring 34. The combustion flow funnels through the internal nozzle 24 and into the canister 26. As the flow contacts a downstream end of the canister 26, the flow is turned 180 degrees. Because the radial orifices 28 are disposed adjacent an upstream end of the canister 26, after turning at the downstream end of the canister 26, the combustion flow exits through the radial orifices 28. The second turn is a 90 degree turn from the canister 26 through the radial orifices 28. A third turn occurs as the flow enters the annular passageway 30 with another 90 degree turn toward the friction weld interface. The combustion flow contacts the friction weld area and turns a fourth turn 90 degrees through the canister castellations 32. Subsequently, the combustion flow turns into the central passageway 40 of the center vent 38 in a fifth turn. A sixth turn for the combustion flow is through the exit passage(s) 42 toward the burst disk assemblies 44. After proceeding through the burst disk assemblies, the combustion flow comes into contact with the internal diameter of the diffuser 47 and turns 90 degrees in a seventh turn toward the diffuser exhaust ports. Subsequently, the combustion flow is expelled into the airbag. The external burst disk assemblies 44 provide hermetic seals outside of the main inflator housing 12. Structural (laser and/or friction) welds provide the robustness required for safety and hermeticity requirements.

Figure 10:
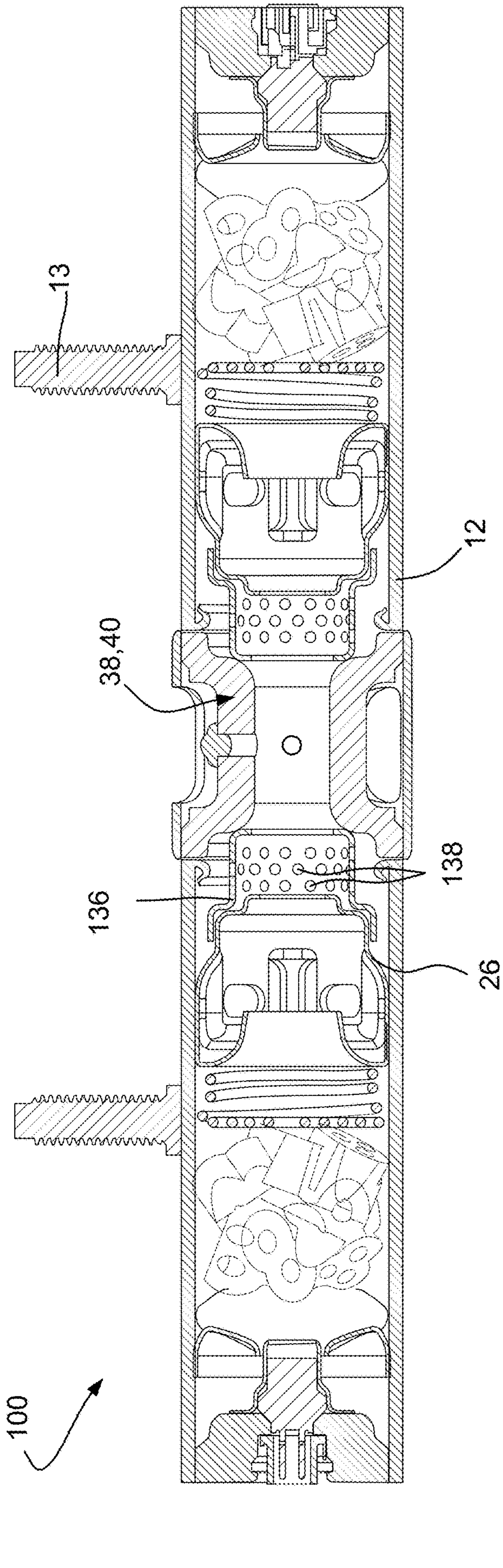
FIG. 10 shows a variation including a screen canister.

FIG. 10 shows a variation of the dual stage airbag inflator 100 and its internal components. In the illustrated variation, a screen canister 136 is positioned over the canister 26 between the canister 26 and the center vent 38 and is also spaced from the inside wall of the cylindrical housing 12. The remaining components are the same as those described with reference to FIGS. 1 and 2. The screen canister 136 is secured via an interference fit with the canister 26. The screen canister 136 can add two more collection areas for debris. The screen canister 136 includes a plurality of apertures 138. In some embodiments, the apertures 138 define a staggered or offset hole pattern.

FIG. 10 also shows external attachment features 13 that can be applied for module retention. The external attachment features 13 are applicable to any of the described embodiments.

Figure 11:
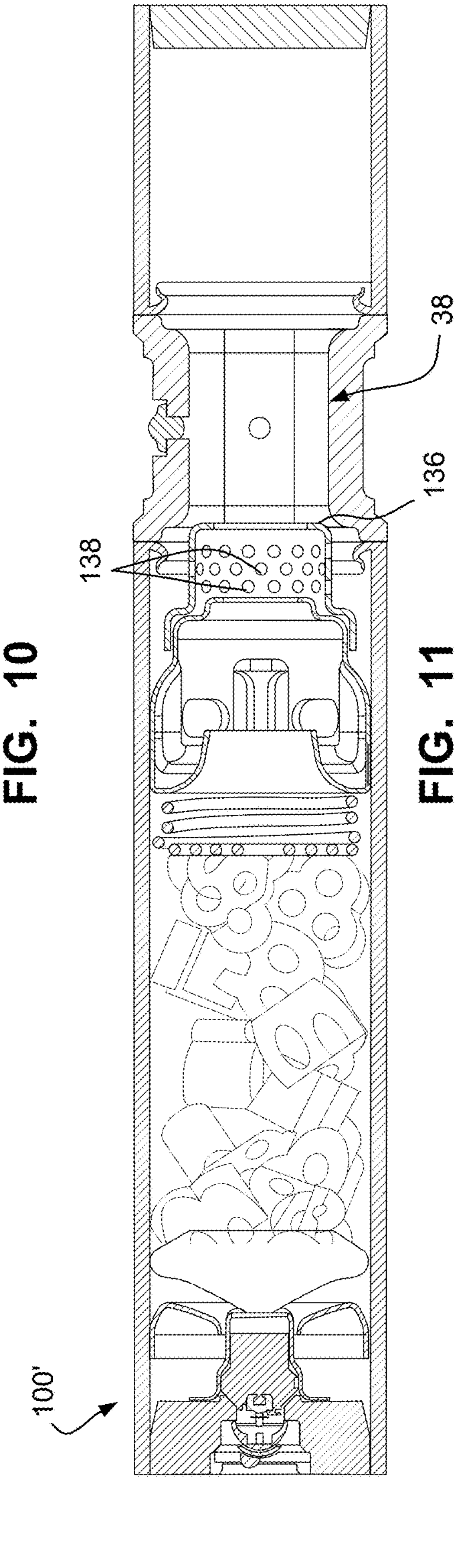
FIG. 11 shows a variation of the single stage embodiment with a screen canister.

FIG. 11 shows a variation of the single stage inflator 100' including the screen canister 136 positioned over the canister 26.

The screen canister 136 provides an additional turn for the products of combustion and also provides a further collection point for debris. After exiting the canister 26 via the radial orifices 28 and turning into the space between the housing 12 and the canister 26, the combustion flow turns 90 degrees into the screen canister 136 via the apertures 138. The flow then turns 90 degrees into the central passageway 40 of the center vent 38.

Figure 12:
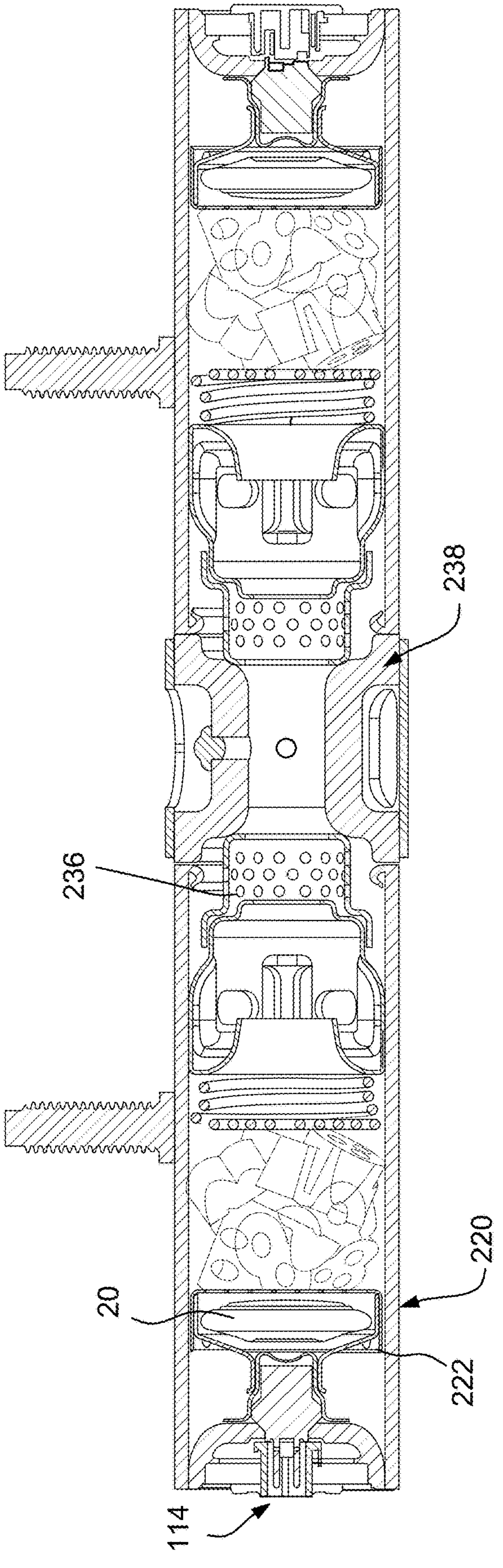
FIG. 12 shows a variation with a modified initiator assembly and an exemplary alternative booster propellant retention option with a canister and lid to house the booster assembly.

FIG. 12 shows a variation with modified components. The initiator assembly 114 may include an igniter body in the form of an all metal part or as shown, a half metal and half molded part. The booster pouch may be modified to be a booster assembly 220 to protect the propellant baggie (teabag material). As shown, the booster assembly 220 may include a canister 222 with a lid to protect the booster pouch 20 from tearing/ripping. The variation shown in FIG. 12 also includes a modified screen canister 236 with a reduced overall height to help with the internal volume and fit-up of the internal components. Additionally, the center vent 238 may be modified to encompass a change to the rupture disk and its holder. The rupture disk may be in the form of a cruciform disk that will allow this part to “petal” open. The design decreases the opportunity for fragments of the disk to be expelled into the airbag. The disk holder in FIG. 12 has been modified to accept the larger diameter of the revised rupture disk.

The inflator assembly of the described embodiments achieves performance outputs, assembly weights, and an envelope profile (overall length and outer diameter) that are conducive to applications in EV technology. The tortuous path defined by the internal components serves to lower particulate levels expelled from the inflator assembly while meeting performance targets. The center vent provides communication between each stage in a dual stage construction, which can also be modified into a single stage assembly. The cylindrical inflator assembly provides repeatable performance, compliant variation and meets all industry standards.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airbag inflator assembly comprising:

a cylindrical housing;

an initiator assembly secured in an upstream end of the cylindrical housing;

a generant disposed in the cylindrical housing adjacent the initiator assembly;

an internal nozzle through which products of combustion flow, the internal nozzle engaging an inside wall of the cylindrical housing;

a canister disposed in the cylindrical housing downstream of the internal nozzle, wherein the internal nozzle tapers toward a nozzle opening and is configured to direct the products of combustion into the canister, a downstream end of the canister being closed, and the canister including radial orifices adjacent an upstream end, wherein an outside diameter of the canister is spaced from the inside wall of the cylindrical housing thereby defining an annular passageway, and wherein the internal nozzle and the canister define a debris collection area adjacent the radial orifices of the canister; and a center vent secured to a downstream end of the cylindrical housing, the center vent including a central passageway adjacent the canister for the products of combustion and an exit passage that directs the products of combustion out of the assembly.

2. The airbag inflator assembly according to claim 1, wherein an interface between the internal nozzle, the inside wall of the cylindrical housing, and the outside diameter of the canister defines a turn point and a particle collection area for the products of combustion.

3. The airbag inflator assembly according to claim 1, wherein the canister comprises exterior castellations through which the products of combustion flow upstream of the center vent.

4. The airbag inflator assembly according to claim 1, wherein the exit passage is oriented 90 degrees relative to the central passageway.

5. The airbag inflator assembly according to claim 4, wherein the center vent comprises two exit passages spaced 180 degrees apart.

6. The airbag inflator assembly according to claim 5, further comprising a burst disk secured at an end of each of the exit passages prior to activation of the inflator assembly.

7. The airbag inflator assembly according to claim 1, further comprising a burst disk secured at an end of the exit passage prior to activation of the inflator assembly.

8. The airbag inflator assembly according to claim 1, wherein an outside diameter of the cylindrical housing is 40 mm or less.

9. The airbag inflator assembly according to claim 1, further comprising a dummy housing secured to a side of the center vent opposite from the cylindrical housing.

10. The airbag inflator assembly according to claim 1, wherein the cylindrical housing comprises a first stage cylindrical housing, the initiator assembly comprises a first stage initiator assembly, the generant comprises a first stage generant, the internal nozzle comprises a first stage internal nozzle, and the canister comprises a first stage canister, the airbag inflator assembly further comprising:

a second stage housing secured to a side of the center vent opposite from the first stage cylindrical housing;

a second stage initiator assembly secured in an upstream end of the second stage housing;

a second stage generant disposed in the second stage housing adjacent the second stage initiator assembly;

a second stage internal nozzle engaging an inside wall of the second stage housing; and a second stage canister disposed in the second stage housing downstream of the second stage internal nozzle.

11. An airbag inflator assembly comprising:

a cylindrical housing;

internal components disposed in the cylindrical housing including an initiator assembly, a generant, an internal nozzle that tapers toward a nozzle opening, and a canister downstream of the internal nozzle, wherein a downstream end of the canister is closed, and wherein the internal nozzle and the canister define a debris collection area adjacent an upstream end of the canister; and a center vent secured to a downstream end of the cylindrical housing, the center vent including a central passageway adjacent the canister for products of combustion and an exit passage that directs the products of combustion out of the assembly, wherein the internal components and the center vent define a tortuous path for the products of combustion with at least six turns.

12. The airbag inflator assembly according to claim 11, wherein an outside diameter of the cylindrical housing is 40 mm or less.

13. The airbag inflator assembly according to claim 11, wherein the internal nozzle is configured to direct the products of combustion into the canister, the canister including radial orifices adjacent an upstream end, wherein an outside diameter of the canister is spaced from an inside wall of the cylindrical housing thereby defining an annular passageway.

14. The airbag inflator assembly according to claim 13, wherein the at least six turns comprise a first turn at a downstream end of the canister and inside the canister in an opposite direction toward the radial orifices, a second turn through the radial orifices and into the annular passageway, a third turn along the annular passageway, a fourth turn at an interface of the center vent and the cylindrical housing, a fifth turn into the central passageway of the center vent, and a sixth turn from the central passageway into the exit passage.

15. The airbag inflator assembly according to claim 14, comprising a seventh turn after contact with a diffuser from the exit passage toward exhaust ports of the diffuser.

16. The airbag inflator assembly according to claim 11, wherein the center vent comprises two exit passages spaced 180 degrees apart.

17. The airbag inflator assembly according to claim 16, further comprising a burst disk secured at an end of each of the exit passages prior to activation of the inflator assembly.

18. The airbag inflator assembly according to claim 11, further comprising a dummy housing secured to a side of the center vent opposite from the cylindrical housing.

19. The airbag inflator assembly according to claim 11, wherein the cylindrical housing comprises a first stage cylindrical housing, the initiator assembly comprises a first stage initiator assembly, the generant comprises a first stage generant, the internal nozzle comprises a first stage internal nozzle, and the canister comprises a first stage canister, the airbag inflator assembly further comprising a second stage housing secured to a side of the center vent opposite from the first stage cylindrical housing, a second stage initiator assembly, a second stage generant disposed in the second stage housing, a second stage internal nozzle, and a second stage canister disposed in the second stage housing downstream of the second stage internal nozzle.

* * * * *